(12) United States Patent
Kurita

(10) Patent No.: US 9,478,899 B2
(45) Date of Patent: Oct. 25, 2016

(54) LIQUIDPROOF CONNECTOR

(71) Applicant: Sumitomo Wiring Systems, Ltd., Yokkaichi, Mie (JP)

(72) Inventor: Atsushi Kurita, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/699,295

(22) Filed: Apr. 29, 2015

(65) Prior Publication Data

US 2015/0325948 A1 Nov. 12, 2015

(30) Foreign Application Priority Data

May 7, 2014 (JP) .................. 2014-095657

(51) Int. Cl.
| | |
|---|---|
| *H01R 4/60* | (2006.01) |
| *H01R 4/64* | (2006.01) |
| *H01R 13/52* | (2006.01) |
| *B60L 11/18* | (2006.01) |
| *H01R 13/74* | (2006.01) |

(52) U.S. Cl.
CPC ....... *H01R 13/5227* (2013.01); *B60L 11/1818* (2013.01); *H01R 13/748* (2013.01); *H01R 4/64* (2013.01)

(58) Field of Classification Search
CPC H01R 13/5227; H01R 13/52; H01R 13/748; H01R 4/64; B60L 11/1818; B60L 11/18
USPC .......................................... 439/206, 205, 34
See application file for complete search history.

(56) References Cited

U.S. PATENT DOCUMENTS

| | | | |
|---|---|---|---|
| 8,662,910 B2 | 3/2014 | Ichio et al. | |
| 2012/0295460 A1* | 11/2012 | Ichio ................ | H01R 13/5208 439/205 |

* cited by examiner

*Primary Examiner* — Javaid Nasri
(74) *Attorney, Agent, or Firm* — Gerald E. Hespos; Michael J. Porco; Matthew T. Hespos

(57) ABSTRACT

A waterproof connector (10) includes a mounting plate (31) to be mounted to a body of a vehicle. A terminal accommodating portion (32) penetrates through the mounting plate (31) in a front-back direction and is configured to accommodate terminals (20) inside. A peripheral wall (51) is provided at an outer peripheral side of the terminal accommodating portion (32). Water guides (54) are provided on a rear end part of the peripheral wall (51) at positions aligned with the mounting plate (31) in the front-back direction and allow communication between outer and inner peripheral sides of the peripheral wall (51). Seals (56) are mounted into mounting holes (55) perforated to form the water guides (54). Retaining portions (61) are provided on rear sides of the seals (56) and are configured to retain the seals (56).

6 Claims, 2 Drawing Sheets

LIQUIDPROOF CONNECTOR

BACKGROUND

1. Field of the Invention

A invention relates to a liquidproof or waterproof connector.

2. Description of the Related Art

U.S. Pat. No. 8,662,910 discloses a vehicle-side connector with a mounting plate to be mounted and fixed to an outer panel of a body of a vehicle. The vehicle-side connector includes a terminal accommodating portion configured to accommodate a terminal fitting inside. The terminal accommodating portion projects in a front-back direction through the mounting plate. An outer tube projects back from the mounting plate toward a vehicle interior side and has an opening. A tapered drainage path is provided on the inner lower surface of the outer tube and extends to the outside of the vehicle. A part of the terminal accommodating portion projecting toward the vehicle interior side is covered over the entire circumference by the outer tube. A rubber plug is mounted in the outer tube so that the entire terminal accommodating portion is sealed while a sealing space is ensured inside the outer tube. The inner lower part of the sealing space has a tapering inclined surface continuous with the drainage path and this inclined surface is a part of the rubber plug. Thus, water that enters the inside of the terminal accommodating portion from a vehicle exterior temporarily enters the sealing space and is discharged to the outside of the vehicle through the inclined surface and the drainage path.

However, the drainage route in the above vehicle-side connector discharges water to the outside of the vehicle by way of the sealing space arranged on a side more toward the vehicle interior side than the mounting plate. The drainage route is excessively long and drainage efficiency is poor. Further, the large rubber plug is necessary to seal the entire terminal accommodating portion, and enlarges the vehicle-side connector.

Accordingly, it is an object of the invention to improve overall operability of a liquidproof connector.

SUMMARY OF THE INVENTION

A waterproof connector disclosed by this specification includes a mounting plate to be mounted and fixed to a body of a vehicle. A terminal accommodating portion penetrates through the mounting plate in a front-back direction and accommodates a terminal inside. A peripheral wall is at an outer peripheral side of the terminal accommodating portion. A water guide is provided on a rear part of the peripheral wall at a position aligned with the mounting plate in the front-back direction. The water guide allows communication between outer and inner peripheral sides of the peripheral wall. A seal is mounted from behind into a mounting hole perforated to cause the water guide to face backward. A retaining portion is provided on a rear side of the seal and is configured to retain the seal.

The above-described configuration has a drainage route configured so that water that enters from the outside of the vehicle moves toward the water guide along the outer peripheral surface of the peripheral wall and is discharged to the outside of the vehicle along the outer peripheral surface of the terminal accommodating portion after falling down in the water guide. The water guide is at the position aligned with the mounting plate in the front-back direction and the drainage route is arranged only on a side more toward the vehicle exterior than the mounting plate. Thus, the drainage route can be shortened as compared with a drainage route that extends by way of a vehicle interior side.

A large seal for sealing the entire terminal accommodating portion is not necessary, and it is sufficient to provide a seal having a necessary minimum size in conformity with the size of the mounting hole. Thus, the waterproof connector can be miniaturized with the miniaturization of the seal.

A closing plate may close a mold removal hole that penetrates through the mounting plate from behind and the retaining portion may protrude from a peripheral edge of the closing plate. Thus, the retaining portion uses an existing component, such as the closing plate, so that the number of components can be reduced. For example, the retaining portion can use a closing plate to close a mold removal hole that is required for molding a lock.

A plurality of the water guides may be provided for further enhancing drainage efficiency.

The liquid guiding portion may be arranged within the range of the mounting hole.

The waterproof connector described herein can shorten the drainage route while miniaturizing the waterproof connector.

These and other features of the invention will become more apparent upon reading the following detailed description of preferred embodiments and accompanying drawings.

DETAILED DESCRIPTION

Figure 1:
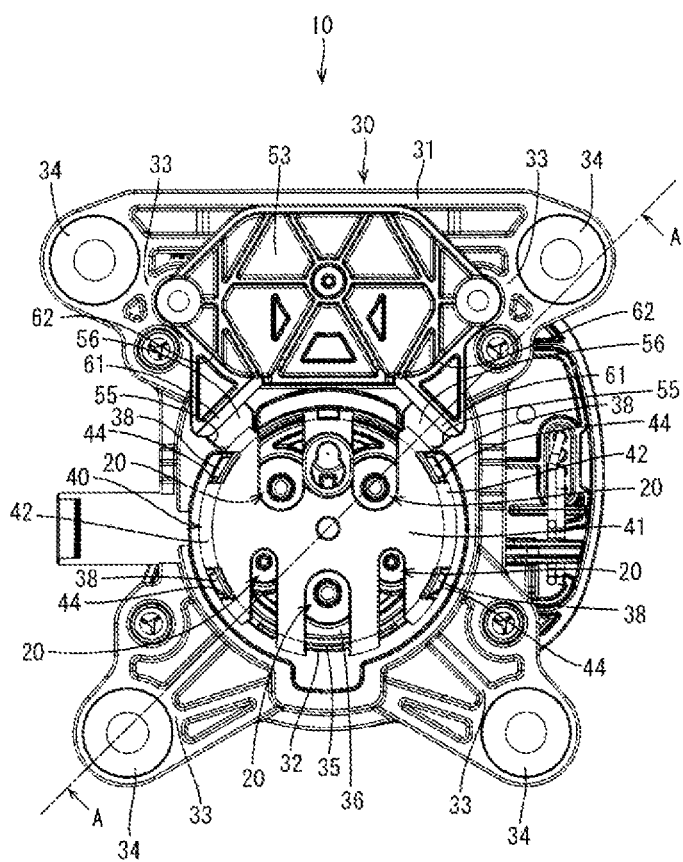
FIG. 1 is a rear view of a waterproof connector.
Figure 2:
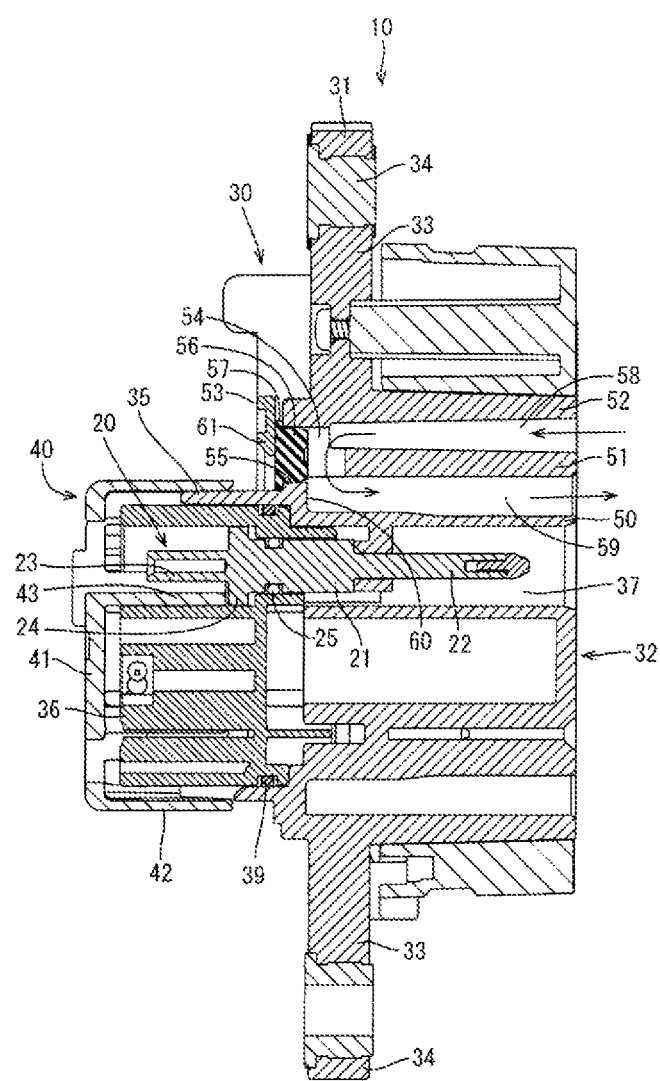
FIG. 2 is a section along A-A of FIG. 1.

A waterproof connector in accordance with an embodiment is identified by the numeral 10 in FIGS. 1 and 2. The connector 10 includes terminals 20, a housing 30 into which these terminals 20 are inserted and a retainer 40 that retains the terminals 20. The waterproof connector 10 is a vehicle-side connector to be mounted, for example, on a body of an automotive vehicle from a vehicle interior side and is an inlet in some cases. Although not shown, the connector 10 is connected, for example, to a battery mounted in the automotive vehicle (such as an electric vehicle or a hybrid vehicle) and the battery is charged by connecting a charging connector provided in a charger from the front.

As shown in FIG. 1, the housing 30 includes a mounting plate 31 to be mounted and fixed to the body of the vehicle by bolts and a substantially hollow cylindrical terminal accommodating portion 32 penetrates through the mounting plate 31 in a front-back direction. The mounting plate 31 has protrusions 33 protruding toward an outer peripheral side with the terminal accommodating portion 32 as a center. Collars 34 are fixed to tip parts of these protrusions 33. Two protrusions 33 are arranged above the terminal accommodating portion 32 are formed integrally and have an inverted triangular shape as a whole.

As shown in FIG. 2, a tubular portion 50 projects forward from the front surface of the mounting plate 31 of the terminal accommodating portion 32 and a rearwardly open receptacle 35 projects from the rear surface of the mounting plate 31. An inner member 36 is mounted in the receptacle 35 to form cavities 37 that penetrate in the front-back direction from the terminal accommodating portion 32 to the inner member 36 when the inner member 36 is mounted in the receptacle 35. The terminals 20 are accommodated in these cavities 37. A seal ring 39 is fit on the outer peripheral surface of the inner member 36, and the interior of the receptacle 35 is sealed in a liquid-tight manner by holding the seal ring 39 in close contact with the inner peripheral surface of the receptacle 35.

The retainer 40 has a retainer main body 41 with locking pieces 43 to be locked to the terminals 20 from behind and a retainer peripheral wall 42 projects forward from the peripheral edge of the retainer main body 41. On the other hand, locking protrusions 38 are provided on the outer peripheral surface of the receptacle 35 and are to be fit and locked to locking holes 44 on the retainer peripheral wall 42. The retainer peripheral wall 42 is fit to the outer peripheral surface of the receptacle 35 when the retainer 40 is mounted onto the receptacle 35 from behind and the locking protrusions 38 are fit and locked to the locking holes 44. Thus, the retainer 40 is fixed to the receptacle 35 and each terminal 20 is retained by each locking piece 43.

The terminal 20 is a male terminal including a solid cylindrical terminal main body 21. A terminal connecting portion 22 projects forward from the front end of the terminal main body 21 and a wire connecting portion 23 projects back from the rear end of the terminal main body 21. The wire connecting portion 23 serves as a crimping portion of a closed barrel type and has a rearwardly open hollow cylindrical shape that can be crimped to a core exposed at an end part of a wire. A flange 24 is provided circumferentially on a rear end part of the terminal main body 21, and the locking piece 43 of the retainer 40 is locked to this flange 24 from behind. A seal ring 25 is fit on the outer peripheral surface of the terminal main body 21, and a clearance between the terminal main body 21 of each terminal 20 and the inner peripheral surface of each cavity 37 of the inner member 36 is sealed in a liquid-tight manner by holding the seal ring 25 in close contact with the inner peripheral surface of the cavity 37 over the entire circumference.

A peripheral wall 51 is provided at an outer peripheral side of the tubular portion 50 in the housing 30 and surrounds the tubular portion 50 over the entire circumference. The peripheral wall 51 has a hollow cylindrical shape and projects forward from the front surface of the mounting plate 31. An unillustrated lock is provided on the upper surface of the outer periphery of the peripheral wall 51. This lock is hooked and locked to a claw on the tip of a lever provided on a charging connector, thereby holding the charging connector in a state connected to the waterproof connector 10.

A substantially U-shaped protection wall 52 is provided on the upper surface of the outer periphery of the peripheral wall 51 for covering the lock. The protection wall 52 projects forward from the front surface of the mounting plate 31. An unillustrated mold removal hole is formed in the mounting plate 31 for molding the lock and penetrates the mounting plate 31 in the front-back direction. A closing plate 53 is mounted to the mounting plate 31 from behind and is fixed (e.g. screwed) to the mounting plate 31, as shown in FIG. 1, for closing and sealing the mold removal hole in a liquid-tight manner.

Left and right retaining portions 61 are provided on the peripheral edge of the closing plate 53. The retaining portions 61 protrude obliquely down from left and right oblique edges 62 extending obliquely out of the peripheral edge of the closing plate 53. The retaining portions 61 are arranged behind seals 56 to be described later to retain the seals 56.

As shown in FIG. 2, a water guide 54 penetrates through a rear part of the peripheral wall 51 and allows communication between outer and inner peripheral sides of the peripheral wall 51 at a position aligned with the mounting plate 31 in the front-back direction. A mounting hole 55 is perforated behind this water guide 54, and the water guide 54 faces backward via the mounting hole 55. Further, the mounting hole 55 is also a mold removal hole for molding the water guide 54. Thus, when viewed from behind, the water guide 54 is arranged within the range of the mounting hole 55. Note that, as shown in FIG. 1, left and right mounting holes 55 overlap the left and right retaining portions 61 and, accordingly, left and right water guides 54 are provided.

The seals 56 are made of rubber and are mounted in each of the mounting holes 55. As shown in FIG. 2, the seals 56 closely contact the inner peripheral surfaces of the mounting holes 55 over the entire circumference so that the mounting holes 55 are closed in a liquid-tight manner. Further, a positioning flange 57 for is provided circumferentially on a rear part of each seal 56. Thus, when the seal 56 is mounted into the mounting hole 55, the flange 57 contacts an opening edge of the rear end of the mounting hole 55 from behind so that the seal 56 is mounted at a proper position. At this time, the front surface of the seal 56 is aligned with the rear surface of the mounting plate 31 in the front-back direction and constitutes part of the water guide 54. On the other hand, the rear surface of the peripheral wall 51 is near a center of the mounting plate 31 in the front-back direction and also constitutes part of the water guide 54. Specifically, the water guide 54 is aligned with the mounting plate 31 in the front-back direction.

As shown in FIG. 2, an entrance space 58 is between the upper surface of the outer periphery of the peripheral wall 51 and the inner surface of the protection wall 52, and may receive liquid such as water that enters from a vehicle exterior. Further, a discharge space 59 is between the outer periphery of the tubular portion 50 and the inner peripheral surface of the peripheral wall 51. The drainage route of this embodiment is a route extending from the entrance space 58 to the discharge space 59 by way of the water guides 54.

Water that enters the entrance space 58 moves along the upper surface of the outer periphery of the tubular portion 50, as shown by arrows in FIG. 2, falls down in the water guides 54, and is discharged to the outside of the vehicle from the discharge space 59 along the upper surface of the outer periphery of the tubular portion 50. The drainage route shown by the arrows in FIG. 2 is only an example and a drainage route in the discharge space 59 may discharge water to the outside of the vehicle along the lower surface of the inner periphery of the peripheral wall 51 after falling downwardly in the water guides 54 and running down along the outer peripheral surface of the tubular portion 50.

The front surface of a back wall 60 located at the rear end of the discharge space 59 is flush with the front surfaces of the seals 56 and is at a position aligned with the rear surface of the mounting plate 31 in the front-back direction. Thus, water in the drainage route is constantly more toward the vehicle exterior side than the position aligned with the rear surface of the mounting plate 31 in the front-back direction and does not enter the vehicle interior side beyond the position aligned with the rear surface of the mounting plate 31. As just described, the drainage route is shorter as compared with the case where it extends by way of the vehicle interior side, and has very high drainage efficiency.

As described above, the drainage route is configured so that water having entered from the outside of the vehicle moves toward the water guides 54 along the outer peripheral surface of the peripheral wall 51, falls down in the water guides 54 and is discharged to the outside of the vehicle along the outer peripheral surface of the terminal accommodating portion 32. The water guides 54 are aligned with the mounting plate 31 in the front-back direction and the drainage route is arranged only on a side more toward the vehicle exterior than the mounting plate 31. Thus, the drainage route is shortened as compared with the case where it extends by way of the vehicle interior side.

Further, a large seal for sealing the entire terminal accommodating portion 32 is not necessary, and the seals 56 may have a necessary minimum size in conformity with the size of the mounting holes 55. Thus, the waterproof connector 10 can be miniaturized with the miniaturization of the seals 56.

The closing plate 53 for closing the mold removal hole that penetrates through the mounting plate 31 from behind may be provided and the retaining portions 61 may protrude from the peripheral edge of the closing plate 53. Accordingly, since the retaining portions 61 are provided using an existing component such as the closing plate 53, the number of components can be reduced. For example, the retaining portions 61 can be provided using the closing plate 53 for closing the mold removal hole for molding the lock.

A plurality of water guides 54 may be provided. Accordingly, drainage efficiency can be enhanced by the plurality of water guides 54.

The invention is not limited to the above described and illustrated embodiment. For example, the following various modes are also included.

Although the terminal accommodating portion 32 comprises a plurality of members (inner member 36, tubular portion 50, etc.) in the above embodiment, it may be composed of a single member.

Although the protection wall 52 for covering the lock is illustrated in the above embodiment, the water guides may be exposed to outside without providing the protection wall. Alternatively, the water guides may be provided at positions different from the lock.

Although the front surfaces of the seals 56 are arranged at positions substantially aligned with the rear surface of the mounting plate 31 in the front-back direction in the above embodiment, they may not be arranged at the aligned positions. In short, the drainage route has only to be arranged on a side more toward the vehicle exterior side than the body of the vehicle.

The retaining portions 61 are unitary with the closing plate 53 in the above embodiment, they may be integral to the retainer or the seals 56 may be retained using separate retaining components.

Although the two water guides 54 are provided in the above embodiment, only one, three or more water guides 54 may be provided.

REFERENCE SIGNS

10 . . . waterproof connector
20 . . . terminal
31 . . . mounting plate
32 . . . terminal accommodating portion
51 . . . peripheral wall
53 . . . closing plate
54 . . . water guide
55 . . . mounting hole
56 . . . seal
61 . . . retaining portion

What is claimed is:

1. A liquidproof connector, comprising:
    a mounting plate to be mounted and fixed to a body of a vehicle;
    a terminal accommodating portion penetrating through the mounting plate in a front-back direction and projecting forward from the mounting plate, the terminal accommodating portion being configured to accommodate at least one terminal inside;
    a peripheral wall projecting forward from the mounting plate at an outer peripheral side of the terminal accommodating portion, the peripheral wall having opposite inner and outer peripheral surfaces;
    a protection wall projecting forward from the mounting plate and spaced from the outer peripheral surface of the peripheral wall;
    at least one opening formed in a rear part of the peripheral wall and substantially aligned with the mounting plate in the front to back direction to define at least one liquid guide and providing communication between the outer and inner peripheral surfaces of the peripheral wall;
    at least one seal mounted into at least one mounting hole perforated to form the liquid guide; and
    at least one retaining portion mounted on the seal and configured to retain the seal.

2. The liquidproof connector of claim 1, wherein, when viewed from behind, the liquid guide is arranged within the range of the mounting hole.

3. The liquidproof connector of claim 1, wherein the retaining portion is mounted on a rear side of the seal.

4. The liquidproof connector of claim 1, further comprising a closing plate configured to at least partly close a mold removal hole that penetrates through the mounting plate.

5. The liquidproof connector of claim 4, wherein the retaining portion protrudes from a peripheral edge of the closing plate.

6. The liquidproof connector of claim 1, wherein the at least one liquid guide comprises a plurality of the liquid guides.

* * * * *